United States Patent [19]

Mauthe

[11] Patent Number: 4,706,806
[45] Date of Patent: Nov. 17, 1987

[54] DESTRUCTIBLE CARTRIDGE FOR ANCHORING RODS OR THE LIKE

[75] Inventor: Peter Mauthe, Kleinberghofen, Fed. Rep. of Germany

[73] Assignee: Hilti Aktiengesellschaft, Fürstentum, Liechtenstein

[21] Appl. No.: 797,432

[22] Filed: Nov. 12, 1985

[30] Foreign Application Priority Data

Nov. 20, 1984 [DE] Fed. Rep. of Germany ....... 3442383

[51] Int. Cl.$^4$ ........................................... B65D 81/32
[52] U.S. Cl. .................................... 206/219; 206/568; 405/261
[58] Field of Search ................. 206/219–222, 206/568; 215/6, 10, DIG. 8; 405/259, 260, , 261

[56] References Cited

U.S. PATENT DOCUMENTS

| | | | |
|---|---|---|---|
| 3,705,646 | 12/1972 | Jankowski et al. | 206/219 |
| 3,913,733 | 10/1975 | Flesch et al. | 206/219 |
| 3,921,800 | 11/1975 | Burns | 405/261 |
| 4,272,898 | 6/1981 | Tansill | 206/219 |
| 4,353,463 | 10/1982 | Seeman | 405/259 |

FOREIGN PATENT DOCUMENTS 2554628 7/1976 Fed. Rep. of Germany .
1423023 11/1965 France ................................ 206/219

Primary Examiner—William Price
Assistant Examiner—Jimmy G. Foster
Attorney, Agent, or Firm—Toren, McGeady and Goldberg

[57] ABSTRACT

A multi-chambered cartridge contains a hardenable mass including resin, a hardener and filler members for securing an anchor rod or the like in a borehole. The cartridge is formed with an outer casing and at least one inner casing. The outer casing is axially elongated and has a first end and a second end with the first end arranged to be inserted first into the borehole. Filler members are placed within the outer casing at the second end. The space between the filler members at the second end and the first end is filled with resin and filler members with the hardener maintained separate from the other components. With this arrangement of the components of the hardenable mass within the outer casing, a low viscosity resin can be employed which does not flow out of the second end when the cartridge is destroyed.

10 Claims, 7 Drawing Figures

DESTRUCTIBLE CARTRIDGE FOR ANCHORING RODS OR THE LIKE

BACKGROUND OF THE INVENTION

The present invention is directed to a destructible multi-chambered cartridge for anchoring rods or similar members in boreholes formed in a receiving material A multi-component hardenable mass is provided in the cartridge made up of resin, a hardener and filler members. The trailing portion of the cartridge, relative to the insertion direction into the borehole, has the filler members occupying almost the entire cross-sectional area with the possible addition of the hardener and the remainder of the cartridge is filled with resin and additional filler members.

In view of the advantages, such as the absence of expansion pressure, high static and dynamic load carrying ability and good chemical durability, anchors secured by hardenable masses are utilized at the present time in a considerable portion of all such attachments. There is the disadvantage, however, of such anchorages in that they are not able to carry a load immediately following insertion into a borehole and the hardenable mass tends to run out of boreholes formed in walls or ceilings. To limit such disadvantages resins with a higher viscosity, that is viscous resins, have been used. A problem is that such resins require a great expenditure of effort for mixing the components of the hardenable mass. Moreover, at a certain viscosity, the wetting of the borehole surface with the resin is no longer assured. Since a layer of drilling dust is deposited on the borehole wall and is not bonded by the viscous mass, areas of separation will occur which lead to a reduction in the anchoring values.

An attempt has been made in a known cartridge to prevent the run-out of the resin from the borehole by filling the entire cross-section of the trailing end of the cartridge with filler and hardener. When such a cartridge is inserted into a borehole, the trailing end of the cartridge is located in the region of the opening into the borehole. As a result, due to the concentration of hardener and filler, the hardening or setting process following the destruction of the cartridge in the borehole commences from the trailing end. The completely or partially hardened resin at the trailing end forms a plug for preventing any run-out of the liquid resin from the forward portion of the borehole.

With the hardener being located only in the trailing end portion of the cartridge, it is generally impossible to provide an adequate distribution of the hardener in the resin during the installation operation. As a consequence, the resin requires a long period to set or in the deeper portions of the borehole it does not set at all and there is a detrimental effect on the quality of the anchorage.

SUMMARY OF THE INVENTION

Therefore, the primary object of the present invention is to provide a multi-chambered cartridge which permits the use of low viscosity resins and, in addition to assuring a rapid and complete setting of the hardenable mass, it prevents any run-out of the resin during and following the installation operation.

In accordance with the present invention, at least a portion of the hardener is contained within the forward part of the cartridge along with the resin and the additional filler members.

A uniform distribution of the hardener with the resin is possible by expending little effort in the mixing operation and it assures that all of the resin hardens in a relatively short period of time according to the present invention. At the same time, however, by providing a concentration of the filler members in the trailing part of the cartridge, the resin which comes into contact with such filler members sets up and does not run out of the borehole.

To avoid any premature setting of the resin by contact with the hardener, the leading end part of the cartridge contains at least one separate destructible casing for the hardener. Such a casing can be provided as a vial formed of glass or some other destructible material and arranged within the body of the resin. It is also possible, however, to enclose the hardener within a number of capsules distributed in the resin.

During the placement of the cartridge within the borehole the various casings making up the cartridge are broken destructed so that the components of the hardenable mass can be mixed together. To provide a uniform mixing relation between the resin and the hardener over the entire anchoring region, the casing containing the hardener extends over the full axial length of the cartridge forward of the filler members placed in the trailing end.

In accordance with the present invention, the mixing ratio of the resin and the hardener is practically constant over the full axial length of the region in the cartridge containing the resin. As a result, it is ensured that a complete set of the resin takes place.

When the cartridge is placed and broken up in the borehole, a portion of the resin flows into the trailing part containing the filler members occupying almost the full cross-sectional area. To ensure that this trailing end part hardens relatively quickly and that run-out of the resin does not take place before it sets, a portion of the hardener is included in the trailing end part along with the filler members. In this trailing end part, the hardener can be applied to the surface of the filler members or it can be distributed between them. By coating the hardener on the filler members, a uniform distribution of the hardener is effected.

The use of fillers serves to reduce the amount of resin and hardener required to fill the annular space between the borehole and the anchor rod so that material costs are reduced. The filler members can cause an increase in the compression and shearing strengths. In accordance with the cartridge embodying the present invention one of its tasks is to prevent any run-out of resin which has not set within the borehole. The prevention of such run-out takes place by the surface wetting of the filler members. To improve this condition, the proportion of the filler members by volume in the trailing end part of the cartridge is considerably higher than in the remaining part. The increase in the density of the filler members can be effected by the manner in which the filler members are formed or by a smaller grain size of the filler members. For the optimum strength of the anchorage, the filler members must be uniformly distributed in the resin. By such uniform distribution, the filler members are prevented from being displaced depending on the position of the cartridge and avoids various regions within the borehole from having different concentrations of the filler members. To assure, as much as possible, a uniform, unchangeable distribution of the filler members in the resin, it is preferred that the filler members within the resin are formed as hollow bodies with their spaces being open to the exterior. With the filler members formed as hollow bodies they can contact one another with their outer surfaces so that they are fixed relative to one another. The effective displacement volume of such filler members, however, is small, since the hollow spaces within the bodies contain resin.

When the anchor member is inserted into the cartridge, leakage of resin out of the borehole must be avoided. To prevent such leakage, it is advantageous to form the hollow bodies as capillary tubes. Such capillary tubes retain a considerable portion of the resin because of the known capillary action. The capillary tubes can be made as bead-like members with passages extending therethrough.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
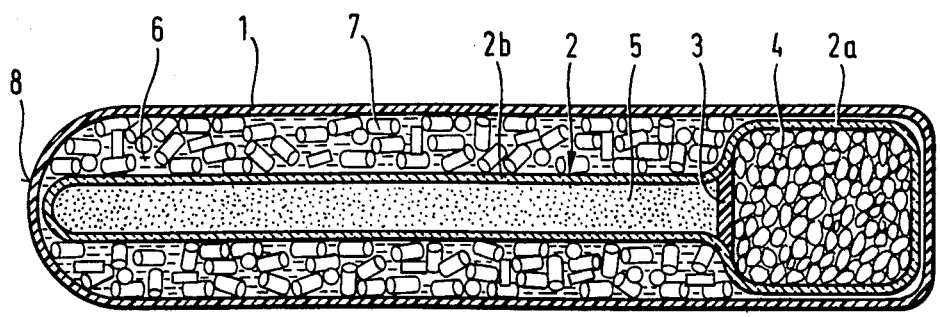
FIG. 1 is an axially extending sectional view of a cartridge embodying the present invention.

A destructible cartridge for the use in securing an anchor bolt or similar member in a borehole is displayed in FIG. 1. The cartridge is an axially elongated member having a leading end and a trailing end. During the placement of the cartridge into a borehole, the leading end 8 is inserted first. The cartridge in FIG. 1 is formed of an axially elongated outer casing 1 with an axially elongated inner casing extending from the leading end to the trailing end of the cartridge. The inner casing 2 has a generally T-shaped configuration in the axially extending sectional view in FIG. 1 with a head portion 2a filling the full transverse cross-section of the outer casing 1 adjacent the trailing end. In addition, a necked-down portion 2b extends from the head portion 2a to adjacent the leading end 8 of the outer casing 1. The necked-down portion has a considerably smaller cross-sectional area than the head portion 2a so that an annular space remains between the outside surface of the necked-down portion and the inside surface of the outer casing. A partition 3 is located at the juncture between the head portion 2a and the necked-down portion 2b affording a separation between the two portions. The head portion is filled with filler members 4. A hardener 5 is enclosed within the necked down portion 2b. The annular space within the outer casing 1 enclosing the necked-down portion 2b contains resin 6 and filler members 7 uniformly distributed throughout the resin. The filler members 7 are hollow bodies with the hollow space within them being open to the exterior of the hollow bodies. The volume of the hollow body filler members represents only a small portion of the volume of the resin 6. When the cartridge is introduced into a borehole, the leading end 8 is inserted first through the opening to the borehole so that it extends for approximately the axial length of the borehole. As a result, the head portion 2a within the outer casing is located in the region of the opening into the borehole and is the first to be broken up or destroyed when an anchor member is inserted into the cartridge within the borehole. The resin 6 forward of the head portion 2a is prevented from running out of the borehole when it is mixed with the hardener and also due to the arrangement of the filler members 4 located in the head portion 2a.

Figure 2:
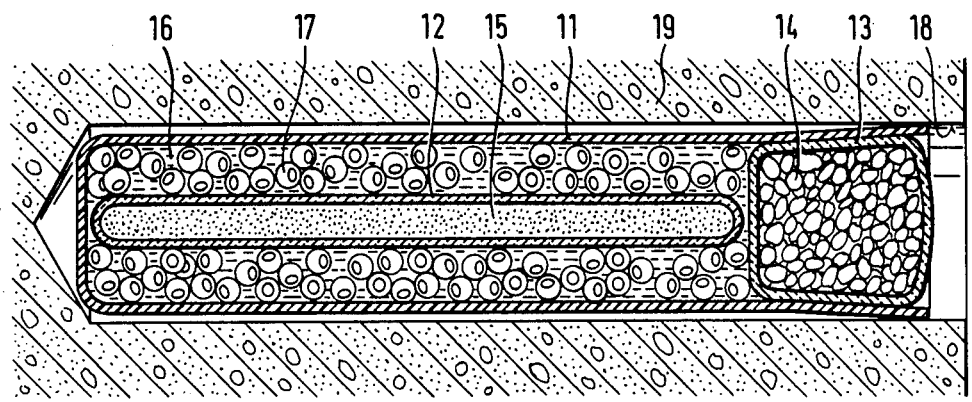
FIG. 2 is a sectional view similar to FIG. 1 illustrating another embodiment of the invention with the cartridge inserted into a borehole.

In FIG. 2 the cartridge illustrated is similar to the cartridge in FIG. 1 and corresponds functionally to that cartridge. The cartridge in FIG. 2 has an outer casing 11 with a leading end shown located in the base of the borehole 18 in the receiving material 19 and a trailing end located adjacent to and slightly inwardly from the opening into the borehole. Within the outer casing 11 there is a hardener casing 12 extending from the leading end of the outer casing for a major portion of its axial length to the inner end of a filler member casing 13. The filler member casing 13 has a plug shape. For sealing the trailing end of the cartridge, that is, the trailing end of the outer casing 11, the filler member casing 13 is provided with conically shaped sealing surfaces extending in the axial direction which effect a sealing action with the corresponding conically shaped surfaces at the trailing end of the outer casing. The casing 13 is almost completely filled with filler members 14. The casing 12 is filled with a hardener 15 in powder form. The casing 12 has a smaller cross-sectional area than the outer casing 11 so that an annular space of considerable volume surrounds the casing 12 within the outer casing 11. The annular space is completely filled with resin 16 and filler members 17. The filler members 17 are hollow bodies with the hollow spaces within them open to the exterior of the bodies. The outer shape of the filler members is such that they completely fill the annular space affording a constant uniform distribution of the filler members 17 in the resin 16. Because of their hollow form, a considerable amount of the resin 16 is located within the hollow spaces in the filler members 17. In FIG. 2 the cartridge is shown inserted into the borehole 18 in the receiving material 19 before it is broken up or destroyed by driving an anchor rod or similar member, not shown, into the cartridge from the trailing end toward the leading end. When the inner and outer casings forming the cartridge are broken up and the resin 16 has not as yet set, the resin is prevented from leaking out of the opening into the borehole 18 due to the presence of the filler members 14.

Figure 3:
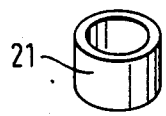
FIGS. 3 to 7 are perspective views of different embodiments of filler members.

In FIGS. 3 to 7 different shapes of the filler members distributed in the resin are illustrated. In FIG. 3 the filler members are short tube sections or tubules 21. If the size of the passage through the tubules 21 is sufficiently small, a capillary action is afforded whereby the resin within the tubules is prevented from running out.

Figure 4:
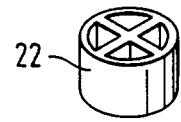

In FIG. 4 a short sleeve or tubular section is shown with two axially extending ribs crossing one another and extending across the full opening within the tube section. The support afforded by the ribs assures that the tube section 22 is not deformable.

Figure 5:
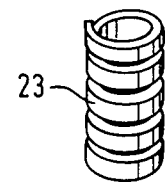

In FIG. 5 another filler member shape is displayed in the form of an axially extending spiral 23. Spiral 23 can be wound from a metal or plastic band or wire.

Figure 6:

In FIG. 6 the filler member is in the form of a triangularly shaped tube section or trihedral. This type of tube section can be extruded with the filler members then being cut to the desired length.

Figure 7:
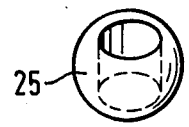

In FIG. 7 the filler member is in the form of a bead-like member 25 with a passageway extending through the bead member. This particular shape is especially favorable for a uniform distribution of the filler members in the resin. The bead-like members 25 can be formed of glass or a ceramic material.

While specific embodiments of the invention have been shown and described in detail to illustrate the application of the inventive principles, it will be understood that the invention may be embodied otherwise without departing from such principles.

I claim:

1. Destructible multi-chambered cartridge for securing an anchor rod or similar member in a borehole formed in a receiving material where the cartridge includes a settable multi-component mass comprising resin, a hardner and filler members, said cartridge comprising an axially elongated outer casing having a first end and a second end spaced apart in the axial direction with the first end arranged to be inserted first into the borehole, enclosure means lying withing the interior of said outer casing for dividing the interior into a first axially extending portion extending from the first end thereof and a second axially extending portion extending from the second end toward the first end with the first and second portions arranged in series, said second portion having at least filler members therein, said first portion having hardener, resin and filler materials therein, wherein the improvement comprises that said enclosure means lying within said first portion encloses said hardener for maintaining said hardener separate from said resin and filler members in said first portion, and said filler members in said first portion are formed as hollow bodies defining hollow spaces open to the exterior of said hollow bodies.

2. Destructible multi-chambered cartride, as set forth in claim 1, wherein said enclosure means comprises at least one destructible inner casing for the hardener.

3. Destructible multi-chambered cartridge, as set forth in claim 2, wherein said inner casing holding the hardener extends from the first end of the outer casing to said second axially extending portion.

4. Destructible multi-chambered cartridge, as set forth in claim 1, wherein said hardener is also included with said filler members located within said second axially extending portion.

5. Destructible multi-chambered cartridge, as set forth in claim 1, wherein the proportoin by volume of said filler members within said second portion is considerably greater than the volume of said filler members within said first portion.

6. Destructible multi-chambered cartridge, as set forth in claim 1, wherein the open spaces within said hollow bodies are formed as capillary passages.

7. Destructible multi-chambered cartridge for securing an anchor rod or similar member in a borehole formed in a receiving material where the cartridge includes a settable multi-component mass comprising resin, a hardener and filler members, said cartridge comprising an axially elongated outer casing having a first end and a second end spaced apart in the axial direction with the first end arranged to be inserted first into the borehole, enclosure means lying within the interior of said outer casing for dividing the interior into a first axially extending portion extending from the first end thereof and a second axially extending portion extending from the second end toward the first end with the first and second portions arranged in series, said second portion having at least filler numbers therein, said first portion having hardener, resin and filler materials therein, wherein the improvement comprises that said enclosure means lying said first portion encloses said hardener for maintaining said hardener separate from said resin and filler members in said first portion, said outer casing forms a completely closed inner space, said enclosure means comprises an inner casing located within said outer casing and extending between the first and second ends thereof, said inner casing having a head portion located in said second axially extending portion with said head portion extending axially toward said first end for a minor part of the axial length thereof, and a necked-down portion located in said first axially extending portion extending from said head portion to the first end of said outer casing with said necked-down portion having a transverse cross-section considerably smaller than the transverse cross-section of said head portion and of said outer casing so that an annular space is located about said necked-down portion between said head portion and the first end of said outer casing, said head portion being filled with filler elements, a seal member separating the interior of said head portion from the interior of said necked-down portion, and said means for containing said hardener comprises said necked-down portion which maintains said hardener separate from the resin and filler members occupying the annular space about said necked-down portion.

8. Destructible multi-chambered cartridge, as set forth in claim 7, wherein said filler members in said annular space are bead-shaped members with a capillary passageway extending therethrough.

9. Destructible multi-chambered cartridge for securing an anchor rod or similar member in a borehole formed in a receiving material where the cartridge includes a settable multi-component mass comprising resin, a hardener and filler members, said cartridge comprising an axially elongated outer casing having a first end and a second end spaced apart in the axial direction with the first end arranged to be inserted first into the borehole, enclosure means lying within the interior of said outer casing for dividing the interior into a first axially extending portion extending from the first end thereof and a second axially extending portion extending from the second end toward the first end with the first and second portions arranged in series, said second portion having at least filler members therein, said first portion having hardener, resin and filler materilas therein, wherein the improvement comprises that said enclosure means lying said first portion encloses said hardener for maintaining said hardener separate from said resin and filler members in said first portion, said outer casing extends from the first end to the second end of said cartridge with said outer casing being closed at the first end and being opened at the second end, said enclosure means includes a first inner casing inserted into the second end of said outer casing in said second axially extending portion and having an outer surface in surface contact with the interior of said outer casing and forming a seal closure for the second end, and a second inner casing located in said first axially extending portion and extending between said first inner casing and the first end of said outer casing and containing the hardener, said second inner casing forming said enclosure means for maintaining said hardener separate from said resin and filler members, said second inner casing being spaced radially inwardly from the inner surface of said outer casing so that an annular space is formed within said outer casing encircling said second inner casing, and said annular space being completely filled with said resin and filler members.

10. Destructible multi-chambered cartridge, as set forth in claim 9, wherein said filler members in said annular space are bead-shaped members with capillary passageway extending therethrough.

* * * * *